(12) United States Patent
Tanaka et al.

(10) Patent No.: US 9,004,928 B2
(45) Date of Patent: Apr. 14, 2015

(54) CONNECTOR STRUCTURE FOR DEVICE CONNECTION

(75) Inventors: Masahiro Tanaka, Makinohara (JP); Hajime Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 282 days.

(21) Appl. No.: 13/643,333

(22) PCT Filed: Oct. 14, 2011

(86) PCT No.: PCT/JP2011/073734
§ 371 (c)(1),
(2), (4) Date: Oct. 25, 2012

(87) PCT Pub. No.: WO2012/056909
PCT Pub. Date: May 3, 2012

(65) Prior Publication Data
US 2013/0040473 A1      Feb. 14, 2013

(30) Foreign Application Priority Data

Oct. 25, 2010   (JP) .................................. 2010-238223

(51) Int. Cl.
*H01R 4/58*         (2006.01)
*H01R 11/00*        (2006.01)
(Continued)

(52) U.S. Cl.
CPC .......... *H01R 13/2414* (2013.01); *B60L 3/0069* (2013.01); *H01R 24/68* (2013.01); *H01R 24/76* (2013.01); *H01R 2105/00* (2013.01); *H01R 2201/26* (2013.01)

(58) Field of Classification Search
CPC ....... H01R 4/58; H01R 13/2414; H01R 11/00
USPC ............. 439/86, 79, 66, 109, 607.3, 544, 34, 439/76.2, 202, 222, 289, 382, 520, 569, 439/617, 692, 845, 872, 950, 908; 200/511, 200/453; 310/71
See application file for complete search history.

(56) References Cited

U.S. PATENT DOCUMENTS 3,871,737  A    3/1975  Dorrell et al.
4,027,936  A    6/1977  Nemoto et al.
(Continued)

FOREIGN PATENT DOCUMENTS

CN      101355204 A      1/2009
GB          851055 A     10/1960
(Continued)

OTHER PUBLICATIONS

Communication from the European Patent Office issued Feb. 20, 2014 in a counterpart European Application No. 11836048.6.
(Continued)

*Primary Examiner* — Abdullah Riyami
*Assistant Examiner* — Harshad Patel
(74) *Attorney, Agent, or Firm* — Sughrue Mion, PLLC

(57) ABSTRACT

A connector structure for device connection includes one connector provided on one device case and the other connector provided on the other device case The one connector includes an insulating housing having a plurality of accommodation recessed sections arrange in parallel, terminals having respective contact plate sections accommodated in the respective accommodation recessed sections, and the conductive rubbers which are in contact with the respective contact plate sections and are accommodated in the respective accommodation recessed sections. The other connector includes terminals respectively having contact plate sections which are pressed to be in contact with the respective conductive rubbers when the two cases are fixed to each other, and an insulating housing which accommodates the terminals.

6 Claims, 6 Drawing Sheets

(51) Int. Cl.
*H01R 13/24* (2006.01)
*B60L 3/00* (2006.01)
*H01R 24/68* (2011.01)
*H01R 24/76* (2011.01)
*H01R 105/00* (2006.01)

(56) References Cited

U.S. PATENT DOCUMENTS

| | | | |
|---|---|---|---|
| 6,671,976 B2 * | 1/2004 | Takahashi et al. | 33/784 |
| 6,821,160 B2 * | 11/2004 | Fink et al. | 439/701 |
| 7,061,169 B1 | 6/2006 | Fung | |
| 7,077,676 B2 * | 7/2006 | Matsumoto et al. | 439/271 |
| 7,549,958 B2 * | 6/2009 | Hirata | 600/179 |
| 2001/0016435 A1 * | 8/2001 | Fujimura | 439/66 |
| 2005/0177027 A1 | 8/2005 | Hirata | |
| 2007/0227757 A1 | 10/2007 | Moore | |

FOREIGN PATENT DOCUMENTS

| | | |
|---|---|---|
| JP | 63-148575 A | 6/1988 |
| JP | 5-38774 U | 5/1993 |
| JP | 8-69830 A | 3/1996 |
| JP | 11-121963 A | 4/1999 |
| JP | 11-135181 A | 5/1999 |
| JP | 2005-218781 A | 8/2005 |
| JP | 2005-218782 A | 8/2005 |

OTHER PUBLICATIONS

Office Action dated Aug. 26, 2014, issued by the Japanese Patent Office in counterpart Japanese Application No. 2010-238223.

Office Action dated Jun. 25, 2014, issued by The State Intellectual Property Office of The People's Republic of China in counterpart Chinese Patent Application No. 201180014590.8.

International Search Report (PCT/ISA/210) dated Jan. 10, 2012, issued by the International Searching Authority in International Application No. PCT/JP2011/073734.

Written Opinion (PCT/ISA/237) dated Jan. 10, 2012, issued by the International Searching Authority, in International Application No. PCT/JP2011/073734.

* cited by examiner (a)　　　　　　　　(b)

(a)       (b)

(a)

(b)

CONNECTOR STRUCTURE FOR DEVICE CONNECTION

TECHNICAL FIELD

The present invention relates to a connector structure for device connection which is used in a case where terminals of connectors of devices such as, for example, a motor, an inverter and the like in an electric vehicle or the like are connected to each other via a conductive rubber.

BACKGROUND ART

In the past, for example, as a device direct mounting connector structure which is used in a case where devices such as a motor, an inverter and the like in a hybrid car (an automobile) or the like are connected to each other via a connector, it is known that, for example, a connector having three L-shaped plate like terminals juxtaposed therein is fixed to a case of one device by fastening with bolts, a connector having three roughly L-shaped plate like terminals juxtaposed therein is fixed to a case of the other device by fastening with bolts, four positioning pins for aligning a connector are provided on one case, positioning holes to be engaged with the positioning pins inserted thereinto are provided on the other case, hole portions of both of the terminals are fastened with bolts and nuts while positioning both of the connectors, and thereby connecting the devices to each other.

In addition, regardless of connection of a motor, an inverter or the like, it is described in Patent Document 1 that a plate shaped terminal on a circuit board and a pin shaped terminal of a connector at a case side are jointed via a conductive rubber in connection of electronic devices.

PRIOR ART DOCUMENTS

Patent Documents

Patent Document 1: JP-A-8-69830 (FIG. 2)

SUMMARY OF THE INVENTION

Problems to be Solved by the Invention

However, in a device direct mounting connector structure of a conventional motor, inverter or the like, it is necessary to ensure a high degree of flatness of a joint face (a bolt fastening face) between terminals. Therefore, problems may arise that the cost is increased, bolts and nuts are necessary for connecting the terminals to each other, a troublesome work for fastening the bolts is necessary, or an aligning mechanism is necessary since an attachment tolerance (a positional deviation) between devices is larger than a fitting tolerance between connectors.

In view of the above problems, in a case where, for example, terminals are made to be male and female terminals and connection by fastening with bolts is eliminated, it is necessary to form a spring section for connection at the female terminal, and it has been concerned that the male and female terminals slide and abrade against one another by vibration of a vehicle or the like or expansion or contraction of the male and female terminals.

In addition, in the above described conventional connection structure with an interposed conductive rubber, it has been concerned that in a case where, for example, conductive rubbers are disposed on respective terminals, it is hard to ensure insulation among the conductive rubbers. Also, it has been concerned that it is hard to surely achieve electromagnetic shielding or waterproofing at a joint section of connectors or a connection section between a conductive rubber and a terminal similarly to the above described device direct mounting connector structure of the motor, the inverter or the like.

The invention is made in view of the above circumstances, and the purpose of the invention is to provide a connector structure for device connection that can cause connectors of devices to be connected to respective terminals by using a conductive rubber with good insulation property, can cause the connectors to be surely connected to each other without using an aligning mechanism, and can surely achieve electromagnetic shielding or waterproofing at a joint section of the connectors.

Means for Solving the Problems

In order to achieve the above purpose, the invention has the following aspects.

(1) A connector structure for device connection includes one connector provided on a case of one device and the other connector provided on a case of the other device. The one connector includes an insulating housing having a plurality of accommodation recessed sections juxtaposed in a line, terminals having respective contact plate sections accommodated in the respective accommodation recessed sections, and conductive rubbers which are in contact with the respective contact plate sections and are accommodated in the respective accommodation recessed sections. The other connector includes terminals respectively having contact plate sections which are pressed to be in contact with the respective conductive rubbers when the two cases are fixed to each other, and an insulating housing which accommodates the terminals.

In accordance with the configuration of the above aspect (1), the conductive rubbers are arranged to be fitted in the respective accommodation recessed sections and are juxtaposed in close proximity to each other, and thereby the conductive rubbers are insulated from each other by a peripheral wall or a partition wall forming the accommodation recessed sections. When the two connectors are jointed to each other, the contact plate sections of the respective terminals elastically compress the conductive rubber and are connected to each other with the conductive rubber therebetween. Each of the contact plate sections of the terminals of the one connector is covered with the conductive rubber in the accommodation recessed section so as to be waterproofed.

Therefore, in accordance with the configuration according to the aspect (1), the contact plate sections of the respective terminals of the one connector and the respective conductive rubbers in contact therewith are accommodated in the respective accommodation recessed sections, and thereby, insulation property between the adjacent contact plate sections and insulation property between the conductive rubbers can be enhanced, and reliability of connection of the connectors can be enhanced. In addition, each of the contact plate sections in the accommodation recessed section is covered with the conductive rubber so that waterproof property of the terminals can be enhanced. Even when a degree of flatness of the contact plate section of each of the terminals is lowered, good electric contact can be achieved by an absorbing action of the conductive rubber so that the cost of the terminals can be reduced. Since it is not necessary to connect the terminals by fastening with bolts, the number of man-hours for fastening with bolts can be reduced and the terminals of both connectors can be surely connected to each other without using an aligning mechanism.

(2) A connector structure for device connection includes one connector provided on a case of one device and the other connector provided on terminals of a plurality of electric wires drawn from the other device. The one connector includes an insulating housing having a plurality of accommodation recessed sections juxtaposed in a line, terminals respectively having the contact plate sections accommodated in the respective accommodation recessed sections and conductive rubbers which are in contact with the respective contact plate sections and are accommodated in the respective accommodation recessed sections. The other connector includes terminals respectively having contact plate sections which are pressed to be in contact with the respective conductive rubbers when the two connectors are jointed to each other, and an insulating housing which accommodates the terminals.

In accordance with the configuration of the above aspect (2), the conductive rubbers are arranged to be fitted in the respective accommodation recessed sections and are juxtaposed in close proximity to each other, and the conductive rubbers are insulated from each other by a peripheral wall or a partition wall forming the accommodation recessed sections. When the two connectors are jointed to each other, the contact plate sections of the terminals elastically compress the conductive rubber and are connected to each other with the respective conductive rubber therebetween. Each of the contact plate sections of the terminals of the one connector is covered with the conductive rubber in the accommodation recessed section so as to be waterproofed. Since the other connector is provided on the terminals of the plurality of electric wires, it is not necessary to consider a positional deviation between the cases.

Therefore, in accordance with the configuration of the above aspect (2), the contact plate sections of the respective terminals of the one connector and the respective rubbers in contact therewith are accommodated in the respective accommodation recessed sections, and thereby, insulation property between adjacent contact plate sections and insulation property between the conductive rubbers can be enhanced, and reliability of connection of the connectors can be enhanced. In addition, each of the contact plate sections in the accommodation recessed section is covered with the conductive rubber so that waterproof property of the terminals can be enhanced. Even when a degree of flatness of the contact plate section of each of the terminals is lowered, good electric contact can be achieved by an absorbing action of the conductive rubber so that the cost of the terminals can be reduced. Since it is not necessary to connect the terminals by fastening with bolts, the number of man-hours for fastening with bolts can be reduced.

(3) In the connector structure for device connection having the configuration according to the aspect (1), at least one of one and the other housings is fixed to the case of at least one of one and the other device by means of a retaining mechanism.

In accordance with the configuration of the above aspect (3), time and labor for fixing the connector to the case by fastening with bolts or the like is eliminated, and the connector is fixed to the case by means of the retaining mechanism such as a latch lance, a latch pawl or the like by one touch action. The retaining mechanism (a latch section) is engaged with an engagement section (a latch receiving section) such as a hole portion, a step portion or the like of the case.

Therefore, in accordance with the configuration of the above aspect (3), time and labor for fixing the connector to the case by fastening with bolts can be eliminated, and the connector can be fixed to the case by means of the retaining mechanism by one touch action.

(4) In the connector structure for device connection having the configuration according to the aspect (1) or (3), conductive surrounding walls surrounding the respective connectors are respectively provided on both of the conductive cases. Either one of the surrounding walls is positioned on an inner side and is low, and the other surrounding wall is positioned on an outer side and is tall, and a leading end portion of the other surrounding wall is in contact with either one of the cases.

In accordance with the configuration of the above aspect (4), since the leading end portion of the conductive surrounding wall positioned on the outer side in the radial direction is in contact with a wall section of the conductive case at the counter side and both of the connectors are positioned at the inside of the inner and outer surrounding walls, the contact plate sections of the terminals which are connection portions of the two connectors and the conductive rubber disposed between the contact plate sections are electromagnetically shielded so that it is possible to prevent noise or the like from entering or leaking. Since the inner and outer surrounding walls are projected from the respective cases in the opposite directions, not only electromagnetic shielding property but also waterproofing (water stopping) property can be achieved by a labyrinth effect.

Therefore, in accordance with the configuration of the above aspect (4), both of the connectors are positioned at the inside of the inner and outer surrounding walls so that it is possible to surely achieve electromagnetic shielding at the connection portions of the connectors by means of both of the surrounding walls. In addition, it is possible to achieve stopping of water into the connectors by means of the inner and outer surrounding walls which are projected in the opposite directions.

BRIEF DESCRIPTION OF THE DRAWINGS

FIG. 1 is an exploded perspective view showing a connector structure for device connection according to a first embodiment of the invention.

FIG. 2 is an exploded perspective view showing an embodiment of a motor side connector.

FIG. 3 is a cross-sectional view showing a connection state of the motor side connector and an inverter side connector taken along A-A line in FIG. 1.

FIG. 4 is an exploded perspective view showing a connector structure for device connection according to a second embodiment of the invention.

FIG. 5 is a perspective view showing an embodiment of the motor side connector.

FIG. 6 is a plan view showing a connection state of the motor side and inverter side connectors.

FIG. 7 is an exploded perspective view showing a connector structure for device connection according to a third embodiment of the invention.

FIG. 12 is a vertical cross-sectional view showing an attaching state of the inverter side connector attached to the case.

FIG. 13 is a vertical cross-sectional view showing the connection state of the two connectors.

MODE FOR CARRYING OUT THE INVENTION

Figure 1:
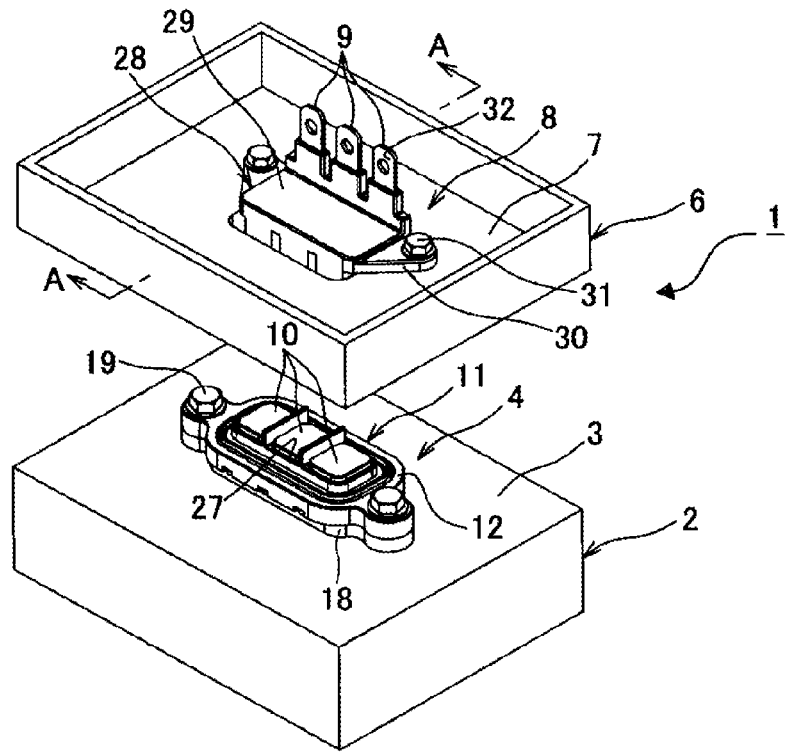
[FIG. 1]
Figure 2:
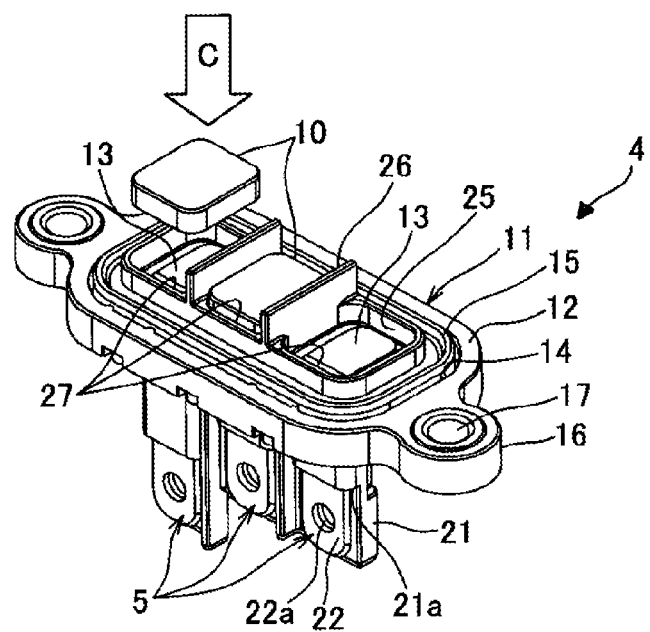
[FIG. 2]
Figure 3:
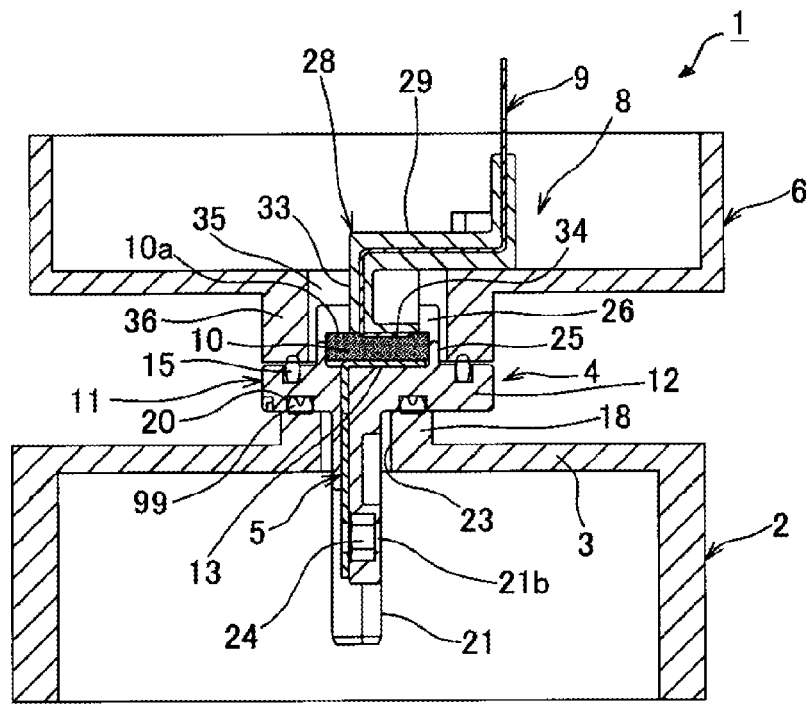
[FIG. 3]

FIGS. 1 to 3 show a connector structure for device connection according to a first embodiment of the invention.

As shown in FIG. 1, this connector structure 1 for device connection is configured such that terminals 5 (see FIG. 2) of a motor side connector 4 (one connector) which is directly mounted at an upper wall 3 of a case 2 made of conductive metal of a motor (one device) and terminals 9 of the other connector 8 which is directly mounted at a lower wall 7 of a case 6 made of conductive metal of an inverter (the other device) are connected to each other via a conductive rubber 10 (see FIG. 2) disposed at the motor side connector 4 at the same time when the cases 2 and 6 of the two devices are fixed to each other as shown in FIG. 3.

As shown in FIG. 2, the motor side connector 4 includes a housing (also referred to as a terminal block) 11 made of an insulating resin, three L-shaped plate like terminals 5 which are arranged in the housing 11 and are made of conductive metal, rectangular shaped conductive rubbers 10 which are juxtaposed on a portion in an upper wall 12 of the housing 11 and are in contact with upper faces of respective horizontal contact plate sections 13 at the top ends of the respective terminals 5, the upper wall 12 being formed by being projected from a periphery of the housing 11 in a sword guard shape, and a waterproof packing 15 made of a rectangular ring shaped rubber which is attached in a peripheral groove 14 of the upper wall 12 and surrounds the three contact plate sections 13.

The housing 11 includes brackets 16 which are disposed at both of right and left sides in a longitudinal direction and have respective bolt insertion holes 17. As shown in FIG. 1, under a condition that a sword guard portion (commonly represented by symbol 12) of the upper wall 12 is abutted to a top of a pedestal 18 provided to be projected at the upper wall 3 of the case 2 of the motor, bolts 19 are inserted into the respective bolt insertion holes 17 from the upper side, and thereby the bolts 19 are fastened and fixed to nuts (not shown) in the pedestal 18. As shown in FIG. 3, a portion between the pedestal 18 and the upper wall 12 can be waterproofed by a waterproof packing 99 made of a rectangular ring shaped rubber disposed in a peripheral groove 20.

The housing 11 shown in FIG. 2 has three roughly plate shaped terminal accommodation sections 21 which are perpendicularly provided at the upper wall 12. Vertical connection plate sections 22 which are respectively continued to the contact plate sections 13 at the upper ends of the respective terminals 5 so as to be perpendicular to the contact plate sections 13, are inserted into the respective terminal accommodation sections 21. Lower end portions with holes 22*a* of the respective connection plate sections 22 are exposed from notch portions 21*a* of the respective terminal accommodation sections 21. The lower end portions are connected to terminals of respective circuits of UVW poles (not shown) in the case 2 of the motor by being fastened thereto by bolts (not shown). As shown in FIG. 3, the terminal accommodation sections 21 are disposed in the case 2 by being passed through the pedestal 18 and hole portions 23 of the upper wall 3. Nuts 24 for fastening communicating with horizontal throughholes 21*b* are disposed at the respective terminal accommodation sections 21.

A rectangular ring shaped peripheral wall 25 and two partition walls 26 which are projected to be taller than the peripheral wall 25, are integrally provided at the inside of the upper wall 12 of the housing 11, and thereby three accommodation recessed sections 27 are formed. The contact plate sections 13 are arranged at the lower portions of the respective accommodation recessed sections 27, and the conductive rubbers 10 are arranged in the respective accommodation recessed sections 27 in such a manner that they are projected to be upper than the peripheral wall 25 and lower than the partition walls 26. The conductive rubbers 10 are inserted into the respective accommodation recessed sections 27 from the upper portion while being faced downward as shown by arrow C. Each of the conductive rubbers 10 is brought into intimate contact with the peripheral wall 25 and the partition wall 26 so as to be positioned, thereby preventing a positional deviation of the conductive rubbers 10 in the horizontal direction (a back-and-forth or right-and-left direction). The tall partition walls 26 increase a creepage distance between adjacent conductive rubbers 10 so as to enhance the insulation property. The terminals 5 are also referred to bus bars. The waterproof packing 15 is projected to be taller than the upper wall 12.

As shown in FIG. 1 and FIG. 3 (a cross-sectional view taken along line A-A in FIG. 1), the inverter side connector 8 includes a housing (also referred to as a terminal block) 28 made of an insulating resin, and three plate shaped terminals (also referred to bus bars) 9 made of conductive metal which are accommodated in the housing 28 and are bent in roughly crank shapes.

As shown in FIG. 1, a pair of brackets 30 are integrally formed on the housing 28 at both right and left ends of the upper wall 29, bolts 31 are downwardly inserted into respective holes of the brackets 30 so that the brackets 30 are screw fastened and fixed to the lower wall 7 of the case 6. Connection plate sections 32 of the respective terminals 9 upwardly projected from the horizontal upper wall 29 of the housing 28 are to be screw fastened and connected to terminals of a circuit (not shown) at a device side.

As shown in FIG. 3, the terminals 9 are accommodated in a wall section (a terminal accommodation section) 33 which is perpendicular to the upper wall 29 of the housing 28 at a lower half part in such a manner that the terminals 9 are bent in crank shapes, and horizontal contact plate sections 34 of the respective terminals 9 are arranged along a lower end face of the wall section 33. The contact plate sections 34 are respectively connected to the contact plate sections 13 of the respective terminals 5 of the motor side connector 4 at the lower side with the respective conductive rubbers 10 therebetween under a condition that the contact plate sections 34 downwardly press the respective conductive rubbers 10 so as to compress the conductive rubbers 10. Each of the conductive rubbers 10 is sandwiched and held by both of the contact plate sections 13 and 34. The conductive rubbers 10 are made of a substance which is formed by adding conductive metallic powders, conductive carbon blacks or the like to a rubber raw material.

The case 6 at an inverter side has the vertical housing part 33 of the inverter side connector 8, and a rectangular shaped hole portion 35 which is adapted to accommodate the peripheral wall 25 and the partition walls 26 at an upper wall 12 side of the housing 11 of the motor side connector 4 and the conductive rubbers 10 held in the peripheral wall 25. The hole portion 35 is formed at the inside of a rectangular cylindrical wall section 36, and a lower end face of the wall section 36 is in contact with the waterproof packing 15 at the upper wall 12 side of the housing 11 and in contact with or in close proximity to an upper face of the upper wall 12.

Fixing the case 2 of the motor and the case 6 of the inverter to each other is carried out by screw fastening of brackets (not shown). At the same time of fixing the two cases 2 and 6 to each other, the contact plate sections 34 of the terminals 9 of the inverter side connector 8 press the respective elastic conductive rubbers 10 so as to cause the conductive rubbers 10 to be strongly brought into intimate contact with the respective contact plate sections 13 of the terminals 5 of the motor side connector 4. The contact plate sections 34 at the upper side break into the respective conductive rubbers 10 in a plate thickness direction (in the downward direction). At the same time, the lower end face of the rectangular cylindrical wall section 36 of the case 6 at the inverter side causes the waterproof packing 15 to be compressed and brought into contact with the upper face of the housing 11 of the (motor side) connector 4 at the upper side, and thereby it is possible to prevent the conductive rubbers 10 from being unnecessarily compressed by the respective contact plate sections 34 of the terminals 9 at the inverter side.

It is specified that an area of the upper face (the contact face) 10a of each of the conductive rubber 10 is larger than an area of the lower face of the corresponding contact plate section 34 of the terminal 9 at the inverter side. Therefore, even when the position of the contact plate section 34 is deviated in a width direction (a back-and-forth or right-and-left direction), the contact plate section 34 is surely brought into contact with the conductive rubber 10. The contact face 10a of each of the conductive rubbers 10 is set to be wider than an attaching dimensional tolerance between the case 2 of the motor and the case 6 of the inverter in the back-and-forth or right-and-left direction with respect to the contact plate section 34 of the terminal 9 at the inverter side, and it is set to be thicker than an attaching dimensional tolerance between the case 2 of the motor and the case 6 of the inverter in a vertical direction.

The fixing the case 2 of the motor and the case 6 of the inverter to each other accompanies a dimensional error between the devices (the motor and the inverter), and thereby a positional deviation is generated between the contact plate sections 13 and 34 of the terminals 5 and 9 of the two connectors 4 and 8 in the plate width direction (a horizontal direction) or the plate thickness direction (a vertical direction). However, by connecting the two contact plate sections 13 and 34 to each other via the elastic conductive rubber 10, the positional deviation between the contact plate sections 13 and 34 in the horizontal direction is absorbed by the large area of the upper face 10a of the conductive rubber 10, and the positional deviation therebetween in the vertical direction is absorbed by deflection in the plate thickness direction of the conductive rubber 10. Consequently, the connection of the terminals 5 and 9 to each other can be surely carried out.

With this, a positioning structure between the cases 2 and 6 of conventional devices can be eliminated. In addition, it is possible to obviate the need for fastening by using a bolt and a nut when the terminals 5 and 9 of the two connectors 4 and 8 are connected to each other. Further, since the contact plate sections 13 and 34 of the respective terminals 5 and 9 break into the conductive rubber 10 so as to be in intimate contact with the conductive rubber 10, it is not necessary to ensure a high degree of flatness of the contact plate sections 13 and 34 as in the past, which was necessary in the past. Moreover, since the contact plate sections 13 and 34 are not rubbed with each other so that abrasion may not occur, it is not necessary to take a countermeasure for vibration.

Figure 4:
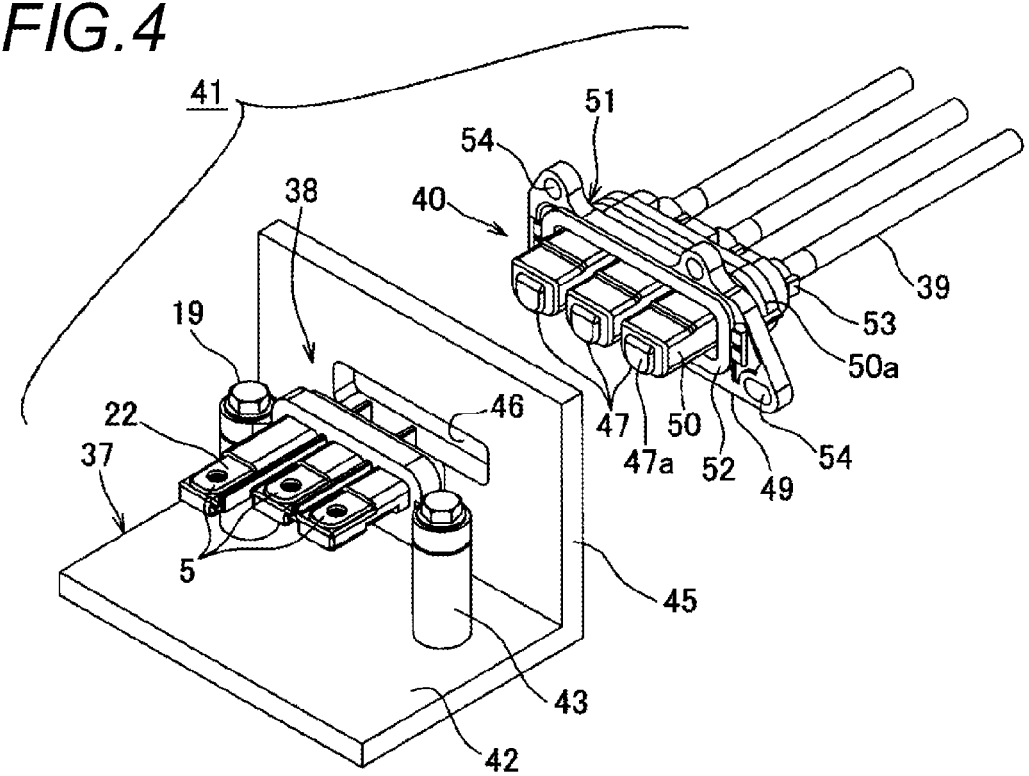
[FIG. 4]
Figure 5:
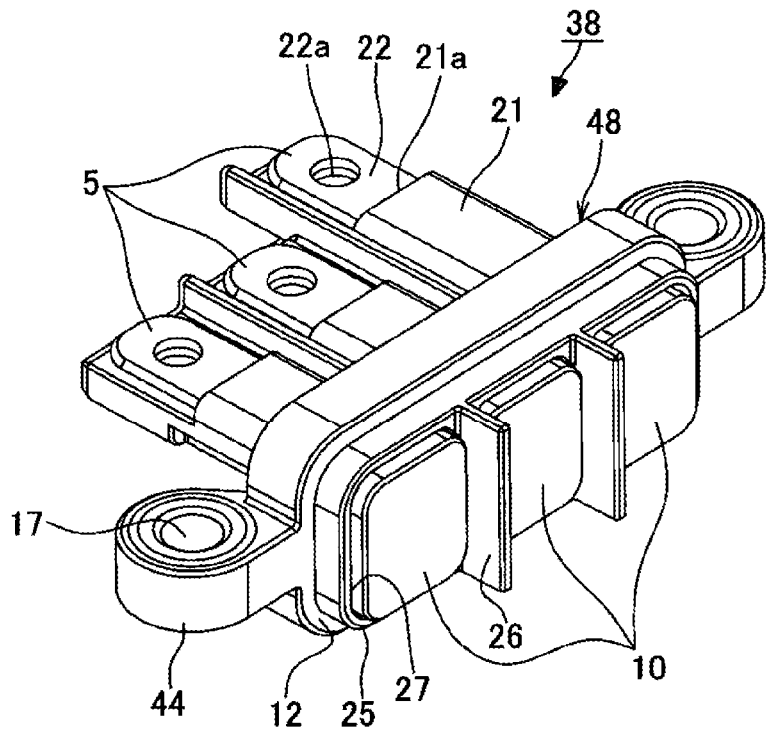
[FIG. 5]
Figure 6:
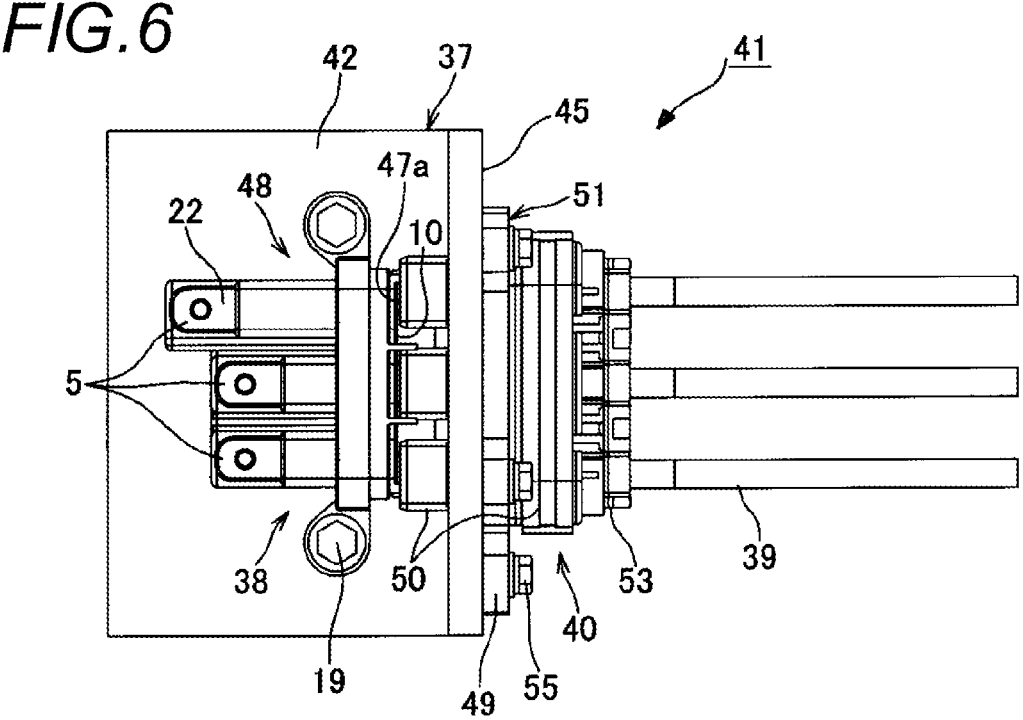
[FIG. 6]

FIGS. 4 to 6 are schematic views showing a connector structure for device connection according to a second embodiment of the invention. A connector structure 41 for device connection is configured such that an inverter side connector 40 of terminals of wire harnesses (a plurality of electric wires) 39 continued to a circuit at the inverter side is connected to a connector 38 directly mounted on a case 37 of a motor (one device) via conductive rubbers 10 (see FIG. 5).

As shown in FIG. 4, the case 37 of the motor has an L-shaped accommodation wall (commonly represented by symbol 37) which is integrally provided at its upper side. A pair of pillars 43 are provided and erected at a horizontal wall section 42 of the accommodation wall 37. Bolt insertion holes 17 disposed at right and left sides of a bracket 44 of the motor side connector 38 shown in FIG. 5 are fastened and fixed to the pillars 43 by bolts 19 from the upper side. The motor side connector 38 is horizontally positioned at the inside of a vertical wall section 45 of the accommodation wall 37. An elongated opening 46 is provided on the vertical wall section 45 so as to face the conductive rubbers 10 at the front end side of the motor side connector 38 as shown in FIG. 5. The inverter side connector 40 shown in FIG. 4 is inserted into the accommodation wall 37 from the opening 46 as shown in FIG. 6, and the contact plate sections 13 (see FIG. 2) and 47a of the respective terminals 5 and 47 of both of the connectors 38 and 40 are connected to each other via the respective rectangular conductive rubbers 10.

The motor side connector 38 in FIG. 5 is configured such that the vertical motor side connector 4 as the embodiment in FIG. 2 is made to be horizontal, and the bolt insertion holes 17 at both right and left sides of a an insulating housing 48 (also referred to as a terminal block) are arranged on a vertical axis line as the embodiment in FIG. 2. Components or members similar to those in FIG. 2 are denoted by the same symbols, and the descriptions thereof are omitted.

As shown in FIG. 5, the contact plate sections (not shown) at the front ends of the respective L-shaped terminals 5 and the conductive rubbers 10 which are in contact with the front faces of the contact plate sections are provided in the accommodation recessed sections 27, each being surrounded by the peripheral wall 25 formed at the inside of the sword guard shaped front wall 12 of the housing (the terminal block) 48 and the partition walls 26 protruding at the front side of the peripheral wall 25. The conductive rubbers 10 are fitted into the respective accommodation recessed sections 27, and are elastically in intimate contact with respective inner peripheral wall faces of the accommodation recessed sections 27, and thereby detaching (falling) of the conductive rubbers 10 from the respective accommodation recessed sections 27 is prevented. The waterproof packing 15 of the embodiment in FIG. 2 is not provided on the front wall 12 of the housing 48. This is because that the housing 48 is disposed in the case 37 of the motor.

The horizontal connection plate sections 22 of the respective terminals 5 are respectively accommodated in the horizontal accommodation walls (the accommodation sections) 21 continued to the vertical front wall 12 of the housing 48 shown in FIG. 5. Rear end portions of the connection plate sections 22 are respectively exposed at the notch portions 21a at the rear end upper side of the accommodation walls 21, and thereby bolts can be respectively and downwardly inserted into the holes 22a of the connection plate sections 22 from the upper side. The upper faces of the connection plate sections 22 are connected to terminals of a circuit at a motor side (not shown) in the accommodation wall 37 of the case shown in FIG. 4.

The inverter side connector 40 in FIG. 4 includes an insulating housing 51 having a vertical wall section 49 with a periphery projected in a sward guard shape and terminal accommodation sections 50 horizontally projected from the wall section 49 to the front and rear sides, terminals 47 with electric wires 39 which are accommodated in the respective terminal accommodation sections 50 and respectively have vertical contact plate sections 47a exposed (projected) from the rear ends of the terminal accommodation sections 50, and a waterproof packing 52 attached in a peripheral groove at the rear face of the wall section 49.

A terminal accommodation section 50a at a front half part from the vertical sward guard shaped wall section 49 as a boundary is adapted to accommodate joint sections (crimp sections) between the electric wires 39 and the respective terminals 47, and is integrally formed in the right-and-left direction. The terminal accommodation sections at a rear half part therefrom are independently formed with respect to the terminals 47. Each of electric wire joint portions (crimp sections) of the terminals 47 is, for example, formed in a cylinder shape, a core wire part of the electric wire 39 is crimped (pressure fastened) in the cylinder portion to be jointed thereto, and the cylinder portion is integrally continued to a horizontal plate shaped portion (not shown) of the terminal 47 at the rear side. A holder 53 made of an insulating resin is attached to the housing 51 at the front side, and the holder 53 prevents a waterproof rubber plug (not shown) from being pulled out, the waterproof rubber plug being extrapolated to the electric wire 39 in the terminal accommodation section 50a. In the specification, as a matter of convenience, it is specified that a draw-out side of the electric wire 39 is a front side.

Each of the vertical contact plate sections 47a (see FIG. 4) is formed by bending at a rear end of a horizontal plate portion (not shown) in the rear half part of each terminal 47. It is specified that an area of the front face (the contact face) of each of the conductive rubbers 10 shown in FIG. 5 is larger than an area of the rear face of the contact plate section 47a, which corresponds to a positional deviation in the upper-and-lower or right-and-left direction between each of the conductive rubber 10 of the motor side connector 38 and the corresponding contact plate section 47a of the terminal 47 of the inverter side connector 40.

A bolt 55 (see FIG. 6) is horizontally inserted into a hole 54 of the vertical sward guard shaped wall section 49 of the housing 51, and thereby the wall section 49 is fastened and fixed to the vertical wall section 45 of the case 37 of the motor. At the same time, the contact plate sections 47a of the terminals 47 of the inverter side connector 40 are brought into pressure contact with the respective conductive rubbers 10 of the motor side connector 38 so as to cause the conductive rubbers 10 to be compressed, and thereby the contact plate sections 47a are connected to the respective terminals 5 of the motor side connector 38 via the conductive rubbers 10. The conductive rubbers 10 are sandwiched and held by the respective contact plate sections 13 and 47a of the two terminals 5 and 47 in the thickness direction. The sward guard shaped wall section 49 of the inverter side connector 40 is in contact with the vertical wall section 45 of the case 37 of the motor, and thereby it is possible to prevent the conductive rubbers 10 of the motor side connector 38 from being unnecessarily compressed by the respective contact plate sections 47a of the terminals 47 at the inverter side.

Since the wire harnesses (the plurality of electric wires) 39 are interposed in this embodiment, a positional deviation between the motor side connector 38 and the inverter side connector 40 is smaller than that of the embodiment shown in FIG. 1. However, even in a case where a positional deviation occurs between the contact plate sections 13 and 47a of the respective terminals 5 and 47 of the two connectors 38 and 40 in the plate width direction (the horizontal direction) or the plate thickness direction (the vertical direction), the two contact plate sections 13 and 47a are connected to each other via the elastic conductive rubber 10, so that the positional deviation in the horizontal direction of the two contact plate sections 13 and 47a is absorbed by the large width dimension of the conductive rubber 10 and the positional deviation in the vertical direction is absorbed by the deflection in the plate thickness direction of the conductive rubber 10. As a result, the connection of the terminals 5 and 47 to each other can be surely achieved.

With this, it is possible to obviate the need for fastening by using a bolt and a nut employed in the past when the terminals 5 and 47 of the two connectors 38 and 40 are connected to each other. In addition, since the contact plate sections 13 and 47a of the respective terminals 5 and 47 break into the conductive rubbers 10 to be intimate contact therewith, it is not necessary to ensure a high degree of flatness of the contact plate sections 13 and 47a, which was necessary in the past. Further, since the contact plate sections 13 and 47a are not rubbed with each other so that abrasion may not occur, it is not necessary to take a countermeasure for vibration.

FIGS. 7 to 13 are schematic views showing a connector structure for device connection according to a third embodiment of the invention. A connector structure 61 for device connection is configured such that the first embodiment shown in FIGS. 1 to 3 is improved so as to enhance the electromagnetic shielding property and the waterproof property at the joint portion of the connectors.

Figure 7:
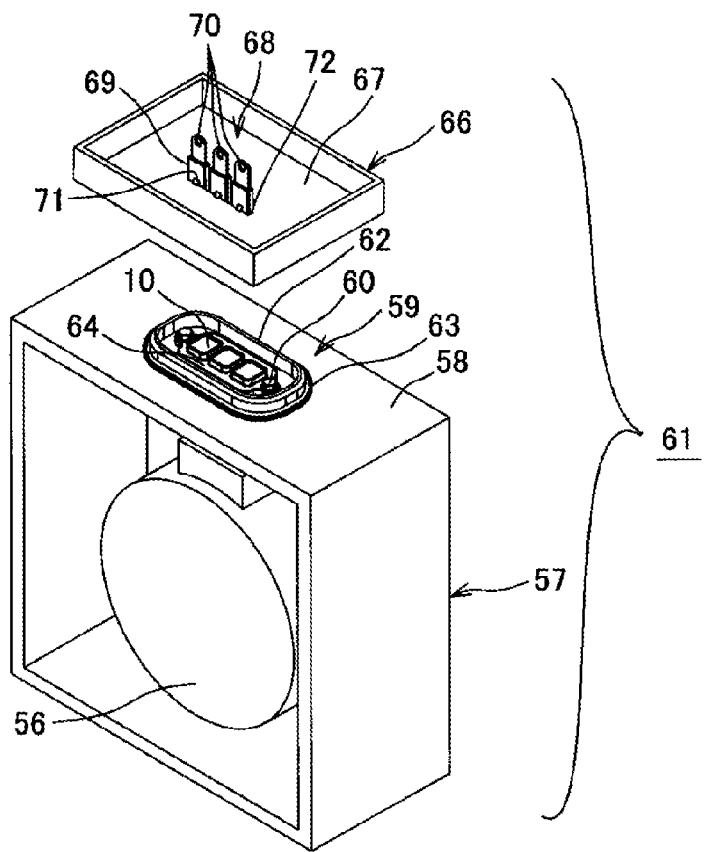
[FIG. 7]
Figure 8:
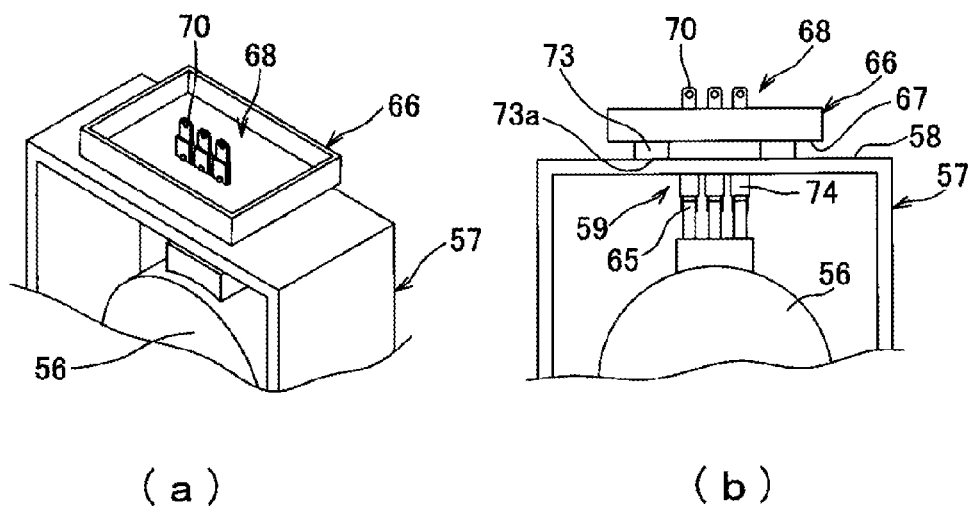
[FIG. 8] FIG. 8($a$) is a perspective view showing a connection state of the motor side and inverter side connectors, and FIG. 8($b$) is a plan view showing the connection state shown in FIG. 8($a$).
Figure 9:
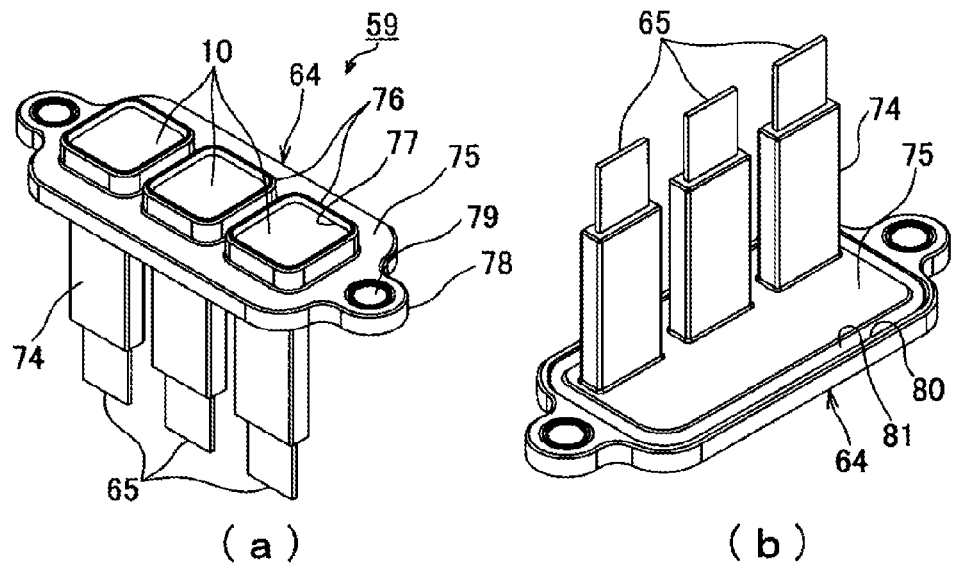
[FIG. 9] FIG. 9($a$) is a top perspective view showing an embodiment of the motor side connector, and FIG. 9($b$) is a perspective view showing the motor side connector shown in FIG. 9($a$) in an up-side-down orientation.
Figure 10:
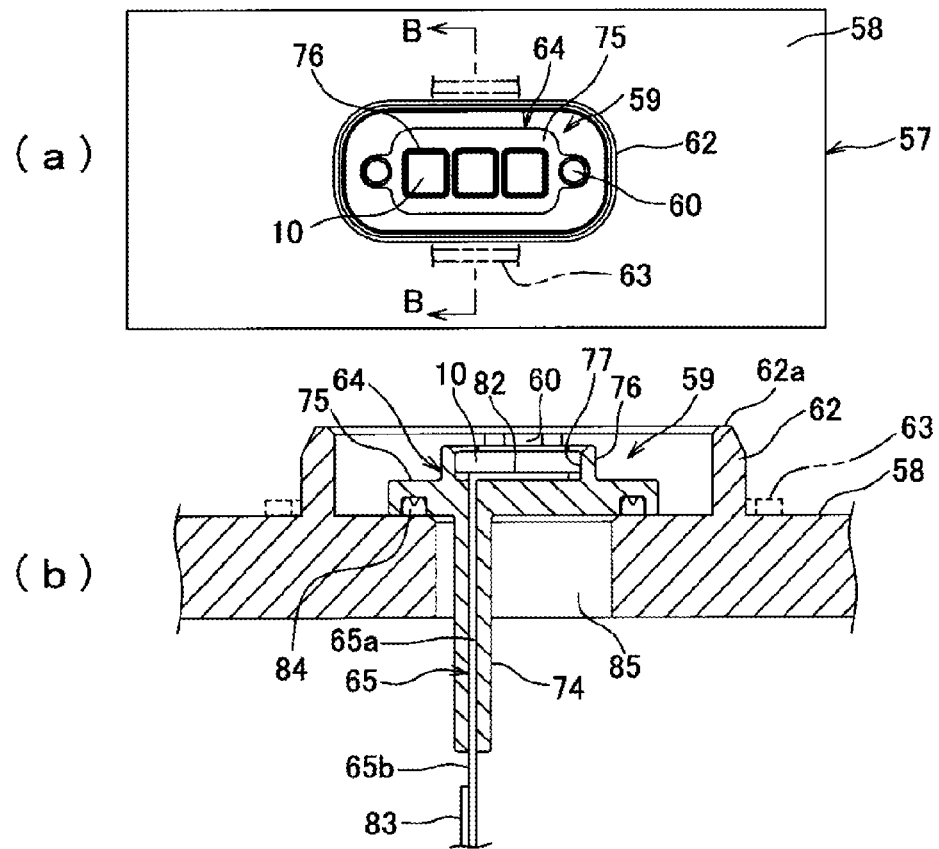
[FIG. 10] FIG. 10(*a*) is a plan view showing an attaching state of the motor side connector attached to a case, and FIG. 10(*b*) is a cross-sectional view showing the attaching state taken along line B-B in FIG. 10(*a*) in an up-side-down orientation.
Figure 11:
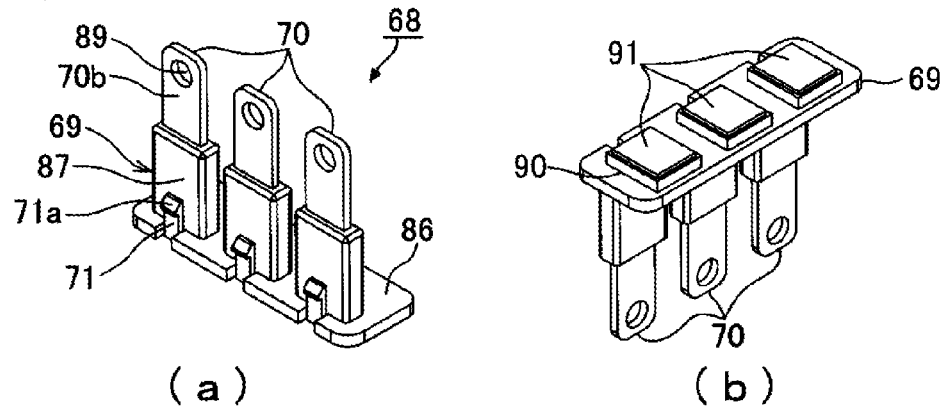
[FIG. 11] FIG. 11(*a*) is a top perspective view showing an embodiment of the inverter side connector, and FIG. 11(*b*) is a perspective view showing the inverter side connector shown in FIG. 11(*a*) in an up-side-down orientation.

As shown in FIG. 7, an elongated motor side connector 59 is fixed to an upper wall 58 of a metallic case 57 enclosing a motor (one device) 56 by a pair of right and left bolts 60. A roughly rectangular ring shaped surrounding wall 62 surrounding the motor side connector 59 is integrally provided and erected at the upper wall 58. A conductive adhesive 63 is applied on the upper wall 58 in a roughly rectangular ring shape in the vicinity of the outside of the surrounding wall 62. The motor side connector 59 includes an insulating housing (also referred to as a terminal block) 64, three conductive metal plate shaped terminals 65 (see FIG. 9) and three conductive rubbers 10.

An inverter side (the other) connector 68 is provided at a lower wall 67 of a case 66 of an inverter (the other device), and the inverter side connector 68 includes an insulating housing (also referred to as a terminal block) 69 and three conductive metal plate shaped terminals 70. The housing 69 is latched (fixed) to an upper edge of a hole portion 72 of the lower wall 67 by means of a latch lance (a retaining mechanism) 71.

As shown in FIGS. 8(a) and 8(b), the case 66 of the inverter is fixed to the case 57 of the motor by screw fastening of a bracket (not shown), and at the same time, the terminals 65 and 70 of the two connectors 59 and 69 are connected to each other via the respective conductive rubbers 10.

As shown in FIG. 8(b), a roughly rectangular ring shaped surrounding wall 73 having a diameter larger than that of the surrounding wall 62 of the case 57 of the motor shown in FIG. 7 is provided on the lower wall 67 of the case 66 of the inverter so as to surround both of connectors 59 and 68. A leading end portion (a lower end) 73a of the surrounding wall 73 pushes and crushes the conductive adhesive 63 shown in FIG. 7 so as to be in contact with the upper wall 58 of the case 57 of the motor. In FIG. 8(b), symbol 74 denotes a lower part of the housing 64 of the motor side connector 59, and symbol 65 denotes a lower part of the terminal. The terminals 65 are connected to terminals (not shown) at the motor 56 side.

FIGS. 9(a) and 9(b) are schematic views showing the motor side connector 59. As shown in FIG. 9(a), three rectangular ring shaped peripheral walls 76 are provided and erected at an upper face of an elongated sward guard shaped horizontal upper wall 75 of the housing 64, and accommodation recessed sections 77 are respectively formed at the insides thereof. The conductive rubbers 10 are accommodated in the respective accommodation recessed sections 77. An upper face of each of the conductive rubbers 10 is positioned to be slightly lower than the upper end of the corresponding peripheral wall 76. Bolts insertion holes 79 are respectively provided on right and left brackets 78 of the upper wall 75. Three rectangular plate shaped terminal accommodation sections 74 are perpendicularly provided to be juxtaposed at the lower side of the upper wall 75, and lower parts of the terminals 65 are respectively projected from lower ends of the terminal accommodation sections 74.

As shown in FIG. 9(b), a rectangular ring shaped waterproof packing 81 is attached in a peripheral groove 80 on the upper wall 75 of the housing 64 at the lower face in the vicinity of the outer periphery. The three terminal accommodation sections 74 are projected and juxtaposed on the lower face of the upper wall 75 at the inside of the waterproof packing 81 in the vicinity of one side end of the lower face.

FIGS. 10A and 10B are schematic views showing a state in which the motor side connector 59 is attached to the case 57 of the motor. As shown in FIG. 10(a), the upper wall 75 of the housing 64 is fixed to the upper wall 58 of the case 57 of the motor by the bolts 60, and the surrounding wall 62 is positioned on the upper wall 75 of the housing 64 on the outer side in the radial direction. As shown in FIG. 10(b) (a cross-sectional view taken along line B-B in FIG. 10(a)), the surrounding wall 62 is projected to be taller than the upper end of the peripheral wall 76 of the housing 64. The top portions of the bolts 60 are positioned between the upper end of the peripheral wall 76 and an upper end 62a of the surrounding wall 62.

Each of the terminal 65 is constituted to have a straight portion 65a vertically passing through the terminal accommodation section 74 of the housing 64, a connection plate section 65b continued to the lower side of the straight portion 65a, and a contact plate section 82 disposed to be bent in a right angle along the upper wall 75 of the housing 64 from the straight portion 65a. The connection plate sections 65b are connected to the respective terminals 83 at the motor side, and the lower faces of the conductive rubbers 10 are respectively in contact with the upper faces of the contact plate sections 82 in the accommodation recessed sections 77 of the housing 64. A packing 84 at the lower side of the upper wall 75 of the housing 64 is in intimate contact with the upper wall 58 of the case 57 of motor, a hole portion (an opening) 85 of the upper wall 58 is positioned at the inside of the packing 84 in the radial direction, and the terminal accommodation sections 74 pass through the hole portion 85. The conductive adhesive 63 is applied on the upper wall 58 in a ring shape at the outside in the radial direction of the surrounding wall 62. The conductive adhesive 63 is not shown in FIG. 10(a).

FIGS. 11(a) and 11(b) are schematic views showing the inverter side connector 68. As shown in FIG. 11(a), three rectangular plate shaped terminal accommodation sections 87 are provided and erected to be juxtaposed on the upper face of a sward guard shaped horizontal lower wall 86 of the housing 69 at a portion in the vicinity of one side end, and latch lances 71 are provided and erected on the upper face of the lower wall 86 along the vertical wall faces of the respective terminal accommodation sections 87. Each of the latch lance has a projection 71a facing the outside at its upper end, and a deflection space 88 (see FIG.12) is formed between a rear face of the latch lance 71 and the wall face of the terminal accommodation section 87.

The straight portions 70a of the terminals 70 are upwardly (vertically) inserted into the respective terminal accommodation sections 87 to pass therethrough, and connection plate sections 70b each having a bolt insertion hole 89 for screw fastening a terminal (not shown) at the inverter side, are provided on the respective straight portions 70a at the tip end sides. As shown in FIG. 11(b), three pedestals 90 are projected to be juxtaposed on a lower face of the lower wall 86 of the housing 69, and a horizontal contact plate section 91 of each of the terminals 70 is disposed on a lower face of each pedestal 90.

Figure 12:
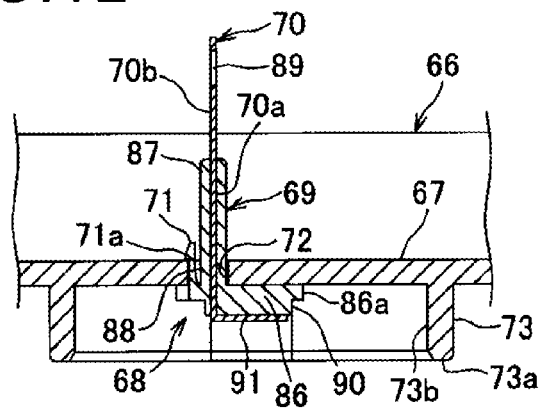
[FIG. 12]

FIG. 12 is a schematic view showing a state in which the inverter side connector 68 is upwardly attached to the lower wall 67 of the case 66 of the inverter from the lower side. Each of the terminal accommodation sections 87 of the connector 68 upwardly passes through the hole portion (the opening) 72 of the lower wall 67. The projections 71a of the latch lances 71 are engaged with an upper end edge of the hole portion 72 so as to latch the connector 68 to the lower wall 67. With this, it is possible to obviate the need for an operation of fixing the inverter side connector 68 to the case 66 of the inverter by screw fastening with bolts. The vertical straight portions 70a of the terminals 70 upwardly pass through the respective terminal accommodation sections 87. The tip end of each of the straight portions 70a is exposed to form the connection plate section 70b, and thereby each of the horizontal contact plate section 91 which is extended from the lower end of the straight portion 70a to be bent in a right angle is in contact with the lower face of the lower wall 86 of the housing 69.

The surrounding wall 73 is perpendicularly provided on the lower face of the lower wall 67 of the case 66 of the inverter in a portion around the lower wall 86 of the housing 69. The leading end portion (the lower end) 73a of the surrounding wall 73 is projected downward to be longer than the contact plate section 91 of the terminal 70 shaping along the lower wall 86 of the housing 69. The inner face 73b of the surrounding wall 73 faces right and left side end faces 86a of the lower wall 86 of the housing 69 and is outwardly far away from the side end faces 86a.

Figure 13:
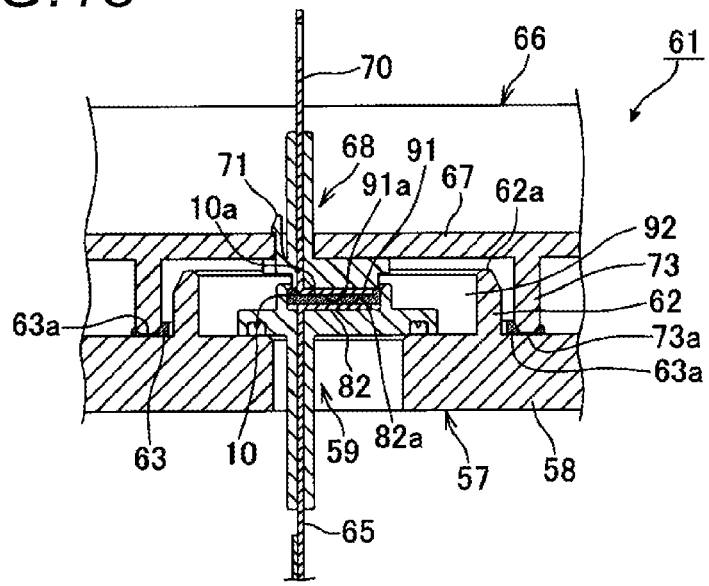
[FIG. 13]

FIG. 13 is a schematic view showing a state in which the two connectors 59 and 68 are connected to each other. The cases 57 and 66 of the two devices are fixed to each other by means of brackets (not shown) or the like, and at the same time, the leading end portion (the lower end) 73a of the surrounding wall 73 of the case 66 of the inverter, the surrounding wall 73 facing downward, pushes and crushes the conductive adhesive 63 at the upper wall 58 of the case 57 of the motor, the leading end portion 73a is brought into contact with the upper wall 58 via a thin film 63a of the conductive adhesive 63 without a gap, and thereby the surrounding wall 73 is bonded and fixed to the upper wall 58 by the conductive adhesive 63. The surrounding wall 62, facing upward, of the case 57 of the motor is positioned at the inside of the surrounding wall 73 of the case 66 of the inverter to be close proximity thereto, and the leading end portion (the upper end)

62a of the surrounding wall 62 is positioned to have a small gap between it and the lower wall 67 of the case 66 of the inverter.

Each of the cases 57 and 66 is made of conductive metal, and the surrounding walls 62 and 73 are integrally formed with the respective cases 57 and 66, namely, made of the conductive metal. Therefore, the terminals 65 and 70 of the respective upper and lower connectors 59 and 68 and the conductive rubbers 10 connecting the terminals 65 and 70 to each other are covered with the double, inner and outer, surrounding walls 62 and 73 so that it is possible to surely prevent noise or the like from entering from the outside or leaking to the outside by electromagnetic shielding. Since the conductive adhesive 63 has a conductivity and a small gap between the leading end portion (the lower end) 73a of the surrounding wall 73 positioned on the outer side and the upper wall 58 of the case 57 of the motor is closed by the conductive adhesive 63, the electromagnetic shielding is enhanced.

In addition, it is possible to surely prevent water or the like from entering the inside from the gap between the leading end portion (the lower end) 73a of the surrounding wall 73 on the outer side and the upper wall 58 of the case 57 of the motor by the conductive adhesive 63. The conductive adhesive 63 is an existing product which is formed such that conductive metallic powders, carbon blacks, or the like are mixed in a soft adhesive made from a synthetic resin. Instead of the conductive adhesive 63, a conductive packing (not shown) or the like can be attached to the upper wall 58 of the case 57 of the motor. However, the surrounding wall 73 on the outer side is not able to be bonded and fixed to the upper wall 58.

Even when the conductive adhesive 63 is harmed and a gap is generated between the surrounding wall 73 on the outer side and the upper wall 58, it is possible to prevent water or the like from entering into a portion at the inside of the surrounding wall 62 positioned on the inner side since the surrounding wall 62 is upwardly provided at the inside of the surrounding wall 73 positioned on the outer side. In a case where the conductive adhesive 63 is replaced with a non-conductive adhesive, the waterproof property is retained, but the shielding property is slightly reduced. It is also possible that the leading end portion 73a of the surrounding wall 73 on the outer side is directly in contact with the upper wall 58 of the case 57 of the motor (almost without a gap) without using the conductive adhesive 63 or a non-conductive adhesive. However, even with the above case, the shielding property is retained, but the waterproof property is reduced.

Since the leading end portion 73a of the surrounding wall 73 on the outer side is in contact with the upper wall 58 of the case 57 of the motor at a counter side, impulsive contact between the upper and lower connectors 59 and 68 (the contact plate section 91 of the terminal 70 on the upper side and the conductive rubber 10 on the lower side) is prevented, unnecessary compression of the conductive rubber 10 is prevented and elasticity of the conductive rubber 10 is properly retained.

In an inner space 92 of the surrounding wall 62 on the inner side, each of the contact plate sections 91 of the terminals 70 of the connector 68 positioned on the upper side breaks into the upper face (the contact face) of the corresponding conductive rubber 10 of the connector 59 positioned on the lower side, and thereby the contact plate section 91 on the upper side is connected to the contact plate section 82 of the terminal 65 on the lower side which is in contact with the lower face of the conductive rubber 10, via the conductive rubber 10. Contact faces 82a and 91a of the two contact plate sections 82 and 91 have the same area (the size and shape), and areas of the upper and lower faces (the contact faces) of the conductive rubber 10 are larger than the respective areas of the contact faces 82a and 91a of the contact plate sections 82 and 91 so that a positional deviation between the contact plate sections 82 and 91 in a back-and-forth or right-and-left direction can be absorbed by the upper and lower contact faces of the conductive rubber 10. A positional deviation between the two contact plate sections 82 and 91 in an upper-and-lower direction is absorbed by a compressing action of the conductive rubber 10 (by changing a change amount of compression as needed).

With respect to the contact plate sections 91 of the terminals 70 at the inverter side, the contact face 10a of each of the conductive rubbers 10 is set to be wider than an attaching dimensional tolerance between the case 57 of the motor and the case 66 of the inverter in the back-and-forth or right-and-left direction, and it is set to be thicker than an attaching dimensional tolerance between the case 57 of the motor and the case 66 of the inverter in an upper-and-lower direction.

Meanwhile, an example in which the inverter side connector 68 is positioned on the upper side and the motor side connector 59 is positioned on the lower side, is described in the embodiment of FIGS. 7 to 13. However, for example, the inverter side connector 68 can be positioned on the lower side, the motor side connector 59 can be positioned on the upper side, or the connectors 59 and 68 can be arranged in a back-and-forth or right-and-left direction (in a horizontal direction). The above configuration (the arrangement of the connectors 59 and 68 is set to be in the upper-and-lower, back-and-forth or right-and-left direction on an as-needed basis) can be similarly applied to the first embodiment shown in FIGS. 1 to 3 or the second embodiment shown in FIGS. 4 to 6.

In addition, in the third embodiment shown in FIGS. 7 to 13, the low surrounding wall 62 on the inner side is provided in the case 57 of the motor and the tall surrounding wall 73 on the outer side is provided in the case 66 of the inverter. Contrary to the above, the tall surrounding wall 73 on the outer side can be provided in the case 57 of the motor, the low surrounding wall 62 on the inner side can be provided in the case 66 of the inverter, and the conductive adhesive 63 can be provided in the case 66 of the inverter, but not in the case 57 of the motor.

Further, in the third embodiment shown in FIGS. 7 to 13, it is possible to use an another retaining mechanism such as a latch projection, a latch pawl or the like instead of the latch lance (a latch arm) 71. The retaining mechanism 71 can be provided on not only the housing 69 of the inverter side connector 68 but also the housing 64 of the motor side connector 59. A portion such as a hole portion or the like to be engaged with the retaining mechanism (the latch section) 71 is referred to as an engagement section or a latch receiving section.

Moreover, in the third embodiment shown in FIGS. 7 to 13, it is possible that the inner and outer surrounding walls 62 and 73 to can be provided not to be integrated with the respective cases 57 and 66, but to be separated therefrom (the surrounding walls 62 and 73 formed of members different from those of the cases 62 and 73 are fixed to the respective cases 57 and 66 by screw fastening or the like). The invention is effective not only for the connector structure for device connection, but also for a connection structure or connection method of connectors for devices, or the like.

Meanwhile, the aforementioned embodiments are only representative examples of the invention, and the invention is not limited thereto. That is, various changes can be made without departing from the essence of the invention. This application is based on Japanese Patent Application (JP- 2010-238223) filed on Oct. 25, 2010, the contents of which are incorporated herein by reference.

Industrial Applicability

The connector structure for device connection according to the invention can be used for surely achieving connection of connectors of a motor and an inverter of an electric vehicle including, for example, a hybrid car even when there is a small positional deviation while additionally exhibiting waterproof property and shielding property.

Description of Reference Numerals and Signs 1, 41, 61 connector structure for device connection
2, 37, 57 case for motor (one device)
4, 38, 59 motor side connector (one side)
5, 9, 47, 65, 70 terminal
6, 66 case of inverter (the other device)
8, 40, 68 inverter side connector (the other side)
10 conductive rubber
11, 28, 48, 51, 64, 69 housing
13, 34, 47a, 82, 91 contact plate section
27, 77 accommodation recessed section
39 electric wire
62, 73 surrounding wall
63 conductive adhesive
71 latch lance (retaining mechanism)
73a leading end portion

The invention claimed is:

1. A connector structure for device connection, the connector structure comprising:
a first connector provided on a case of one device; and
a second connector provided on a case of the other device,
wherein the first connector comprises:
a first insulating housing having a plurality of accommodation recessed sections arranged in parallel;
terminals respectively including contact plate sections accommodated in the accommodation recessed sections respectively and extending sections; and
conductive rubbers which are in contact with the contact plate sections respectively and which are accommodated in the accommodation recessed sections respectively; and
wherein the second connector comprises:
terminals respectively including contact plate sections which are pressed to be in contact with the conductive rubbers respectively when the two cases are fixed to each other; and
a second insulating housing which accommodates the terminals;
wherein the extending sections of the terminals of the first connector extend in a fixing direction where the two cases are fixed to each other, and the contact plate sections of the terminals of the first connector are shaped into a flat plate and extend in a direction substantially perpendicular to the fixing direction,
wherein the contact plate sections of the terminals of the first connector are in face-contact with bottom surfaces of the recessed sections of the first connector respectively, and
wherein the contact plate sections of the terminals of the first connector are in face-contact with the conductive rubbers respectively.

2. The connector structure for the device connection according to claim 1, wherein at least one of the first and second insulating housings is fixed to the respective case of at least one device by a retaining mechanism.

3. The connector structure for the device connection according to claim 1, wherein conductive surrounding walls surrounding the respective connectors are respectively provided on the conductive cases;
wherein one of the surrounding walls is positioned on an inner side and is lower, and the other surrounding wall is positioned on an outer side and is taller; and
wherein a leading end portion of the other surrounding wall is in contact with either one of the cases.

4. The connector structure for the device connection according to claim 1, wherein the terminals of the second connector respectively include extending sections which extend in the fixing direction,
wherein the contact plate sections of the terminals of the second connector are shaped into flat plate and extend in a direction substantially perpendicular to the fixing direction, and
wherein the second housing has wall section which are in face contact with the contact plate sections of the terminals of the second connector respectively.

5. A connector structure for device connection, the connector structure comprising:
a first connector provided on a case of one device; and
a second connector provided on terminals of a plurality of electric wires drawn from the other device,
wherein the first connector comprises:
a first insulating housing having a plurality of accommodation recessed sections arranged in parallel;
terminals respectively including contact plate sections accommodated in the accommodation recessed sections respectively and extending sections; and
conductive rubbers which are in contact with the contact plate sections respectively and which are accommodated in the accommodation recessed sections respectively; and
wherein the second connector comprises:
terminals respectively having contact plate sections which are pressed to be in contact with the conductive rubbers respectively when the two connectors are jointed to each other; and
a second insulating housing which accommodates the terminals;
wherein the extending sections of the terminals of the first connector extend in a joint direction where the two cases are jointed to each other, and the contact plate sections of the terminals of the first connector are shaped into a flat plate and extend in a direction substantially perpendicular to the joint direction,
wherein the contact plate sections of the terminals of the first connector are in face-contact with bottom surfaces of the recessed sections of the first connector respectively, and
wherein the contact plate sections of the terminals of the first connector are in face-contact with the conductive rubbers respectively.

6. The connector structure for the device connection according to claim 5, wherein the terminals of the second connector respectively include extending sections which extend in the joint direction,
wherein the contact plate sections of the terminals of the second connector are shaped into flat plate and extend in a direction substantially perpendicular to the joint direction, and
wherein the second housing has wall sections which are in face contact with the contact plate sections of the terminals of the second connector respectively.

* * * * *